United States Patent
Burczyk et al.

(10) Patent No.: US 7,509,865 B2
(45) Date of Patent: Mar. 31, 2009

(54) PRESSURE DIFFERENTIAL SENSOR COMPRISING AN EXCESS-LOAD MEMBRANE

(75) Inventors: Dietfried Burczyk, Teltow (DE); Wolfgang Dannhauer, Teltow (DE); Ralf Nürnberger, Potsdam (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/588,852

(22) PCT Filed: Feb. 2, 2005

(86) PCT No.: PCT/EP2005/050461

§ 371 (c)(1),
(2), (4) Date: Apr. 10, 2007

(87) PCT Pub. No.: WO2005/075952

PCT Pub. Date: Aug. 18, 2005

(65) Prior Publication Data

US 2007/0289386 A1    Dec. 20, 2007

(30) Foreign Application Priority Data

Feb. 9, 2004   (DE) ................. 10 2004 006 383

(51) Int. Cl.
*G01L 7/08* (2006.01)

(52) U.S. Cl. .............. 73/715; 73/716; 73/756

(58) Field of Classification Search ........... 73/700–756; 361/283.1–283.4

See application file for complete search history.

(56) References Cited

U.S. PATENT DOCUMENTS

| 4,072,058 | A |   | 2/1978 | Whitehead |
|---|---|---|---|---|
| 4,160,600 | A | * | 7/1979 | Luke ........................... 356/506 |
| 4,221,134 | A | * | 9/1980 | Ekstrom, Jr. ................. 73/721 |
| 4,342,231 | A | * | 8/1982 | Yamamoto et al. ............ 73/721 |
| 4,370,890 | A | * | 2/1983 | Frick ........................... 73/718 |
| 4,539,850 | A | * | 9/1985 | Ziegler ........................ 73/706 |
| 6,543,291 | B1 | * | 4/2003 | Kurtz et al. .................. 73/716 |

FOREIGN PATENT DOCUMENTS

| DE | 30 47 619 A1 | 9/1981 |
|---|---|---|
| DE | 287 328 A5 | 2/1991 |
| DE | 196 08 321 A1 | 8/1997 |

\* cited by examiner

*Primary Examiner*—Andre J Allen
*Assistant Examiner*—Jermaine Jenkins
(74) *Attorney, Agent, or Firm*—Bacon & Thomas, PLLC

(57) ABSTRACT

A pressure difference transducer includes a hydraulic body, in which is formed an overload chamber containing an overload membrane. The overload chamber divides the overload chamber into a high-pressure chamber portion and a low-pressure chamber portion. The high-pressure chamber portion communicates with a first hydraulic path, which extends between a first diaphragm seal and a high-pressure side of a pressure measuring cell, and the low-pressure chamber portion communicates with a second hydraulic path, which extends between a second diaphragm seal and a low-pressure side of the pressure measuring cell. The low-pressure chamber portion has an essentially convex membrane bed, against which the overload membrane lies in a rest position.

7 Claims, 1 Drawing Sheet

PRESSURE DIFFERENTIAL SENSOR COMPRISING AN EXCESS-LOAD MEMBRANE

TECHNICAL FIELD

The present invention concerns pressure differential, or difference, sensors, or transducers.

BACKGROUND DISCUSSION

Pressure differential sensor in which pressure is transferred to a measuring element by means of a pressure-transfer liquid, especially such pressure difference transducers having an excess-load, or overload, membrane, or diaphragm will be considered. Such a pressure difference transducer is disclosed, for example, in the Offenlegungsschrift (laid open German application) DE 196 08 321 A1. Pressure difference transducers include a hydraulic body, in which an overload chamber is formed. The overload chamber contains an overload membrane. The overload membrane divides the overload chamber into a high-pressure half-chamber and a low-pressure half-chamber. The high-pressure half-chamber is connected into, i.e. communicates with, a first hydraulic path; the first hydraulic path extends between, on the one hand, a first diaphragm seal involving a separating membrane, or diaphragm, over a membrane bed, and, on the other hand, a high-pressure side of a pressure measuring cell. The low-pressure half-chamber communicates with a second hydraulic path, which extends between, on the one hand, a second diaphragm seal involving a separating membrane over a membrane bed, and, on the other hand, a low-pressure side of the measuring element. Other terms used in the art for such diaphragm seals include "chemical seal", "pressure intermediary", and "pressure mediator".

In the case of large overloads, the pressure-transfer liquid is forced completely out of the diaphragm seal, and the separating membrane lies on the membrane bed. The pressure-transfer liquid displaced in the relevant hydraulic path in the case of overload pressure leads to a deflection of the overload membrane. This absorbs the additional volume and reduces the overload pressure.

The spring stiffness of the overload membrane is a function of operating temperature range, the possible system pressure, the volume of the hydraulic, pressure-transfer liquid, and the overload factor of the measuring element. The overload factor defines how much the overload pressure can exceed the measuring range before the separating membrane comes to rest, and no further pressure increase occurs at the measuring chip. The greater the overload factor of the measuring element, the stiffer the overload membrane can be made. The stiffer the overload membrane, the faster the measuring cell reacts to pressure fluctuations, that is, the cell then reacts faster to fluctuations in pressure. This is especially important in the case of sensors having diaphragm-seal add-ons connected with the sensor via long capillary lines. A long capillary line has a large hydraulic resistance and, with the overload membrane, forms an RC-element. In the case of a soft overload membrane having a large hydraulic capacitance C, this can lead to large time constants, and respectively long response times.

The spring stiffness of the overload membrane is generally symmetric in the HP and LP directions. The overload factor of the measuring element is clearly different between HP and LP loading. The design of the symmetrical overload membrane depends on the lower burst value of the measuring element, a factor which unnecessarily increases the time constant of the high-pressure side of the pressure difference transducer.

SUMMARY OF THE INVENTION

It is, therefore, an object of the invention to provide a pressure difference transducer which overcomes the described disadvantages.

This object is achieved by a pressure transducer which includes a hydraulic body, in which an overload chamber containing an overload membrane is constructed. The overload membrane divides the overload chamber into a high-pressure chamber portion and a low-pressure chamber portion. The high-pressure chamber portion communicates with a first hydraulic path, which extends between a diaphragm seal and the high-pressure side of a pressure measuring element, and the low-pressure chamber portion communicates with a second hydraulic path, which extends between a second diaphragm seal and the low-pressure side of a pressure measuring cell. The pressure difference transducer of the invention is characterized in that the low-pressure chamber portion has an essentially convex membrane bed, on which the overload membrane lies in the rest position. I.e., in the low-pressure chamber portion in the rest position, practically no pressure-transfer medium is present between the membrane bed and the overload membrane to be displaced in the case of overloading. As a result, in the case of overloads on the high-pressure side, the overload membrane is practically no longer deflected, and, thus, essentially has a hydraulic capacitance of zero against overloads on the high-pressure side. (In this analysis, the hydraulic capacitance due to the compressibility of the pressure-transfer medium is disregarded.) To reduce overloads on the low-pressure side, the overload membrane can be deflected, with the deflection occuring first above a certain overload threshold, when the overload membrane has been prestressed over the convex membrane bed.

The term "convex" means herein that the shortest connecting line between any two points on the surface of the low-pressure side of the membrane bed runs through the body on which the membrane bed is formed, or along the surface of the membrane bed. That is, the low-pressure side is essentially planar, or it is curved outward, or it has a combination of these qualities, with, in this case, such combination being a planar area surrounded by a curved area. If necessary, optionally present depressions, or hydraulic canals, can be cut by such connecting line. These depressions or canals can be formed in the surface of the membrane bed for distributing the pressure on the low side under the overload membrane, and, in the case of overloading, to enable a faster deflection of the overload membrane. Likewise, the pressure feed line to the low pressure side of the pressure measuring cell can be branched from such a depression. This is advantageous in that the unloading of the pressure measuring cell, in the case of overloading on the low pressure side, is immediately effected by deflecting the overload membrane. The depressions and canals named are dimensioned such that, at any rate, in the case of overloading on the high pressure side, such do not lead to hydraulically relevant deflections of the sections of the overload membrane covering the depressions; that is, they create no relevant capacitance with respect to overloads on the high pressure side.

The invention is especially suitable for providing pressure difference sensors for high pressure differences, for example with measuring ranges up to 16 bar, 40 bar, or up to 100 bar in the case of system pressures of some hundred bar, for example up to 400 bar.

The pre-stressing of the overload membrane over the convex membrane bed can be set, in accordance with a further development of the invention, such that the deflection of the overload membrane, in the case of overloads on the low-pressure side, occurs first when the measuring range is exceeded. However, it is also possible to construct a planar membrane bed, in which case the overload membrane, in the case of LP-loading, already moves in accompaniment in the measuring range.

The overload membrane can be formed as a full-surface membrane, as well as a ring membrane which is secured in the middle. In the case of given overload stroke, centrally-secured, ring membranes permit a more compact construction of the hydraulic body than full-surface membranes, and they are less susceptible to hysteresis at a given volume stroke.

A diaphragm seal in terms of the invention includes, for example, a diaphragm seal body which has a diaphragm-, or membrane-, bed, over which a separating membrane is secured, which membrane can be loaded with a pressure to be measured. A pressure chamber is formed between the separating membrane and the diaphragm seal body. The pressure chamber communicates with a hydraulic path, via which a pressure measuring cell can be loaded with the pressure prevailing in the pressure chamber. The diaphragm seal body can be integrated into the hydraulic body, or it can be arranged separately from the hydraulic body.

In the nominal pressure range of the pressure transducer, the separating membrane is deflected as a function of the pressure and does not contact the membrane bed. In the case of large overloads, the pressure-transfer liquid is completely pressed out of the pressure chamber, and the separating membrane comes to rest against the membrane bed. Once the separating membrane contacts the membrane bed, further pressure increase in the respective hydraulic path is no longer possible.

Without compensating measures, the described asymmetric form of the overload chamber effects an asymmetry as regards the volumes of the pressure-transfer liquids. This can lead to different, temperature-dependent deflections of the separating membranes, which deflections, due to the finite stiffness of the separating membranes, can lead to a zero point error. However, since the present invention concerns especially pressure difference sensors having a measuring range of 10 bar and above, the zero point error due to the asymmetric deflection of the separating membranes is disregarded in most cases, because the stiffness of the separating membranes is very low compared to the measuring range.

For the case that this zero point error should still be avoided, it is appropriate to provide a symmetrization of the respective products of fill volume and coefficient of thermal expansion of the pressure-transfer liquids with the stiffness of the separating membranes on the high- and low-pressure sides. For this, each of the factors can be adjusted accordingly. That is, a chamber for an additional fill volume can be provided on the low pressure side, for example, without affecting the support of the separating membrane by the convex membrane bed. Equally, a more flexible separating membrane can be provided on the high-pressure side, in order to compensate for the greater fill volume of the high-pressure side. Lastly, a pressure-transfer liquid with a lower coefficient of thermal expansion can be used on the high-pressure side.

BRIEF DESCRIPTION OF THE DRAWINGS

Further details of the invention are explained in the example of an embodiment illustrated in the drawing, the sole FIGURE of which shows as follows.

DETAILED DESCRIPTION OF THE DRAWINGS

Figure 1:
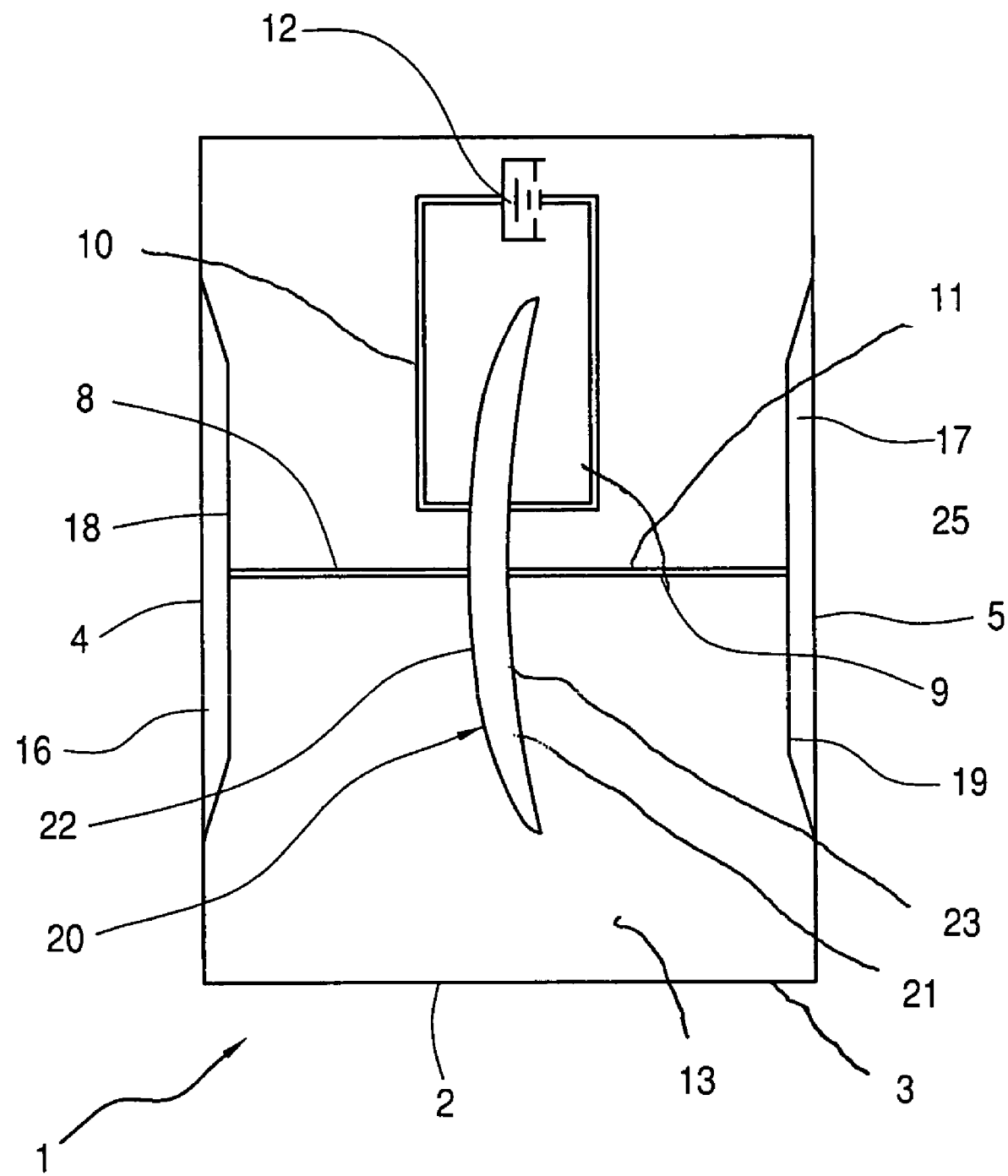
FIG. 1 a section view through a pressure difference transducer of the invention.

The pressure difference transducer illustrated in FIG. 1 includes an essentially cylindrical, hydraulic body 1, which has a first half 2 and a second half 3. Each half has, on an end face, a membrane bed 18, 19, over which a separating membrane 4, 5 is secured. Between the separating membranes and the membrane beds, in each case, a pressure chamber 16, 17 is formed, from which a pressure canal 8, 9 extends into the interior of the hydraulic body 1. In particular, a first pressure canal 8 extends from the first pressure chamber 16 to a high-pressure chamber portion 20, which is formed between an overload membrane 13 and the end surface of the first half 2 facing away from the first pressure chamber 16, and a second pressure canal 9 extends from the second pressure chamber 17 to a low-pressure chamber portion 21, which is formed between the overload membrane 13 and the end face of the second half 3 facing away from the second pressure chamber 17. The high-pressure chamber portion 20 has a concave wall 22, which is formed in the corresponding end face of the first half-body 2. The low-pressure chamber portion 21 has a wall formed as a convex membrane bed 23 in the corresponding end face of the second half. The overload membrane 13 is pre-stressed over the membrane bed 23; that is, when the overload membrane 13 is in the rest position, the volume of the low-pressure chamber portion 21 is practically zero. As a result, in the case of overloads on the high-pressure side, the overload membrane cannot be deflected in order to reduce these overloads. On the other hand, in the case of overloads on the low-pressure side, the overload membrane can be deflected when these loads exceed a threshold predetermined by the pre-stressing. In this manner, the low-pressure side is effectively protected against overloads without compromising the dynamic behavior of the pressure difference transducer.

Branching from the high-pressure chamber portion 20 is a first canal 10, via which the high-pressure side of the pressure measuring cell 12 is loaded with the pressure prevailing in the high-pressure chamber portion 20. Equally, a second canal 11 extends from the low-pressure chamber portion 21 to the low-pressure side of the pressure measuring cell 12. For this, a connecting canal 25 is formed as a depression in the surface of the membrane bed 23. The connecting canal extends between the second pressure canal 9 and the second canal 11.

The pressure difference measuring cell can be any suitable pressure difference measuring cell familiar to those skilled in the art. In relation to the present invention, the type of measuring cell does not matter. In the example of the embodiment, the pressure measuring cell 12 comprises a semiconductor membrane having a flexible region with a thickness of, for example, 30 μm, and integrated piezoresistive resistance elements. The semiconductor membrane has a ring-shaped edge region, which, on the low-pressure side, is considerably thicker than 30 μm, for example several 100 μm. With the edge region on the low-pressure side, the membrane is pressure-tightly secured along a joint on an abutment. Thus, in the case of a pressure overload on the high-pressure side of the semiconductor membrane, the edge region of the membrane is pressed against the abutment. There is hardly any danger that the joint could fail. On the other hand, in the case of a pressure overload on the low-pressure side of the semiconductor membrane, tensile forces arise in the joint, as well as possible stress concentrations between the edge region of the low-pressure side and the flexible region of the semiconductor membrane.

Thus, a lower overload resistance of the pressure difference measuring cell against overloads on the low-pressure side is present. This is taken into account in the construction of an overload chamber, which includes the high-pressure chamber portion 20 and the low-pressure chamber portion 21, as well as an overload membrane 13.

The overload membrane 13 can thereby react early to overloading on the low-pressure side, without compromising the dynamics of the pressure difference transducer when detecting rapid pressure fluctuations on the high-pressure side.

The invention claimed is:

1. A pressure difference transducer, comprising:
    a hydraulic body, in which is formed an overload chamber;
    an overload membrane, contained in said overload chamber which divides said overload chamber into a high-pressure chamber portion and a low-pressure chamber portion;
    a pressure measuring cell, said high-pressure chamber portion communicates with a first hydraulic path, which extends between a first diaphragm seal and a high-pressure side of said pressure measuring cell, and said low-pressure chamber portion communicates with a second hydraulic path, which extends between a second diaphragm seal and a low-pressure side of said pressure measuring cell, wherein:
    said low-pressure chamber portion has an essentially convex, membrane bed, against which the overload membrane lies in a rest position; and
    said overload membrane is not deflectable by high-pressure-side overloads.

2. The pressure difference transducer as claimed in claim 1, wherein:
    said overload membrane is pre-stressed over said convex membrane bed.

3. The pressure difference transducer as claimed in claim 2, wherein:
    said overload membrane is not deflectable by low-pressure-side overloads below a threshold value.

4. The pressure difference transducer as claimed in claim 1, wherein:
    said first and second diaphragm seals each comprise a diaphragm seal body which has a membrane bed, over which is secured a separating membrane, which can be loaded with a pressure to be measured; and
    between said separating membrane and said diaphragm seal body a pressure chamber is formed, which communicates with one of said first and second hydraulic path, via which said pressure measuring cell can be loaded with a pressure prevailing in said pressure chamber.

5. The pressure difference transducer as claimed in claim 4, wherein:
    said diaphragm seal bodies of said first and second diaphragm seals are formed as one piece with said hydraulic body.

6. The pressure difference transducer as claimed in claim 4, wherein:
    said diaphragm seal bodies of said first and second diaphragm seals are arranged separately from said hydraulic body, and are connected with it via pressure lines.

7. A pressure difference transducer, comprising:
    a hydraulic body, in which is formed an overload chamber;
    an overload membrane, contained in said overload chamber which divides said overload chamber into a high-pressure chamber portion and a low-pressure chamber portion;
    a pressure measuring cell, said high-pressure chamber portion communicates with a first hydraulic path, which extends between a first diaphragm seal and a high-pressure side of said pressure measuring cell, and said low-pressure chamber portion communicates with a second hydraulic path, which extends between a second diaphragm seal and a low-pressure side of said pressure measuring cell, wherein:
    said low-pressure chamber portion has an essentially convex, membrane bed, against which the overload membrane lies in a rest position;
    said first and second diaphragm seals each comprise a diaphragm seal body which has a membrane bed, over which is secured a separating membrane, which can be loaded with a pressure to be measured; and
    between said separating membrane and said diaphragm seal body a pressure chamber is formed, which communicates with one of said first and second hydraulic path, via which said pressure measuring cell can be loaded with a pressure prevailing in said pressure chamber.

* * * * *